US012659075B2

(12) United States Patent (10) Patent No.: US 12,659,075 B2
Kumar (45) Date of Patent: Jun. 16, 2026

(54) ADAPTATION OF ERROR-RATE THRESHOLD

(71) Applicant: Mellanox Technologies, Ltd., Yokneam (IL)

(72) Inventor: Alok Kumar, Bangalore (IN)

(73) Assignee: Mellanox Technologies, Ltd, Yokneam (IL)

(*) Notice: Subject to any disclaimer, the term of this patent is extended or adjusted under 35 U.S.C. 154(b) by 16 days.

(21) Appl. No.: 18/788,231

(22) Filed: Jul. 30, 2024

(65) Prior Publication Data

US 2026/0039415 A1 Feb. 5, 2026

(51) Int. Cl.
*H04L 1/00* (2006.01)

(52) U.S. Cl.
CPC .......... *H04L 1/0045* (2013.01); *H04L 1/0036* (2013.01)

(58) Field of Classification Search
CPC ............................. H04L 1/0045; H04L 1/0036
USPC .......................................... 714/776, 748–750
See application file for complete search history.

(56) References Cited

U.S. PATENT DOCUMENTS

| | | | | |
|---|---|---|---|---|
| 6,141,388 A | * | 10/2000 | Servais ............. | H03M 13/4161 |
| | | | | 714/759 |
| 10,291,261 B2 | * | 5/2019 | Yen ................... | H03M 13/3715 |
| 10,397,143 B1 | * | 8/2019 | Plenderleith ......... | H04L 49/257 |
| 2009/0213940 A1 | * | 8/2009 | Steinbach ............ | H04N 19/895 |
| | | | | 375/E7.208 |
| 2016/0191189 A1 | * | 6/2016 | Mitchell ............ | H04Q 11/0005 |
| | | | | 398/48 |
| 2018/0091332 A1 | * | 3/2018 | Rothermel ............ | H04L 1/0047 |
| 2018/0316741 A1 | * | 11/2018 | Hassan ............... | H04L 41/5009 |
| 2019/0124575 A1 | * | 4/2019 | Long ................... | H04W 60/005 |
| 2021/0182118 A1 | * | 6/2021 | Sahin ................ | H04W 52/0225 |
| 2023/0396357 A1 | * | 12/2023 | Tagare .................. | H04L 1/0014 |
| 2025/0203451 A1 | * | 6/2025 | Henry .................... | H04L 47/24 |

* cited by examiner

*Primary Examiner* — Albert Decady
*Assistant Examiner* — Osman M Alshack
(74) *Attorney, Agent, or Firm* — Meitar Patents Ltd.; Daniel Kligler

(57) ABSTRACT

A communication device includes a receiver, a Forward Error Correction (FEC) decoder and a processor. The receiver is to receive, over a network, communication traffic that conveys a bit sequence including data encoded with a FEC code. The FEC decoder is to decode the FEC that encodes the bit sequence so as to reproduce the data. The processor is to assess a condition of the network by analyzing the communication traffic, and, depending on the condition of the network, adjust an error rate threshold for the bit sequence provided to the FEC decoder.

14 Claims, 1 Drawing Sheet

ADAPTATION OF ERROR-RATE THRESHOLD

TECHNICAL FIELD

The present disclosure relates generally to data communication systems, and particularly to methods and systems for adaptation of error-rate thresholds.

BACKGROUND

Data communication systems often use Forward Error Correction (FEC) codes for maintaining reliable performance over noisy channels. Any FEC code has a finite error correction capability, and will ultimately fail when channel conditions become exceedingly harsh. Some communication systems employ retransmission mechanisms, in which the receiver requests the transmitter to retransmit a data unit that was not received properly. Retransmission can be triggered, for example, when the error correction capability of the FEC is exceeded.

SUMMARY

An embodiment that is described herein provides a communication device including a receiver, a Forward Error Correction (FEC) decoder and a processor. The receiver is to receive, over a network, communication traffic that conveys a bit sequence including data encoded with a FEC code. The FEC decoder is to decode the FEC that encodes the bit sequence so as to reproduce the data. The processor is to assess a condition of the network by analyzing the communication traffic, and, depending on the condition of the network, adjust an error rate threshold for the bit sequence provided to the FEC decoder.

In some embodiments, the processor is to request retransmission of at least part of the data in response to detecting that an actual error rate of the bit sequence exceeds the error rate threshold. In an example embodiment, by adjusting the error rate threshold, the processor is to adjust a trade-off between (i) error correction by the FEC code and (ii) error correction by the retransmission.

In a disclosed embodiment, the processor is to set the error rate threshold to a value that is less than an error correction capability of the FEC code. In an embodiment, the processor is to identify a priority assigned to the communication traffic, and to adjust the error rate threshold based on both the condition of the network and the priority.

In some embodiments, to assess the condition of the network, the processor is to measure a Signal to Noise Ratio (SNR) of the communication traffic. Additionally, or alternatively, to assess the condition of the network, the processor is to measure a latency of the communication traffic. Further additionally or alternatively, to assess the condition of the network, the processor is to measure a Bit Error Rate (BER) of the communication traffic.

There is additionally provided, in accordance with an embodiment that is described herein, a communication method including receiving, over a network, communication traffic that conveys a bit sequence including data encoded with a Forward Error Correction (FEC) code. The FEC that encodes the bit sequence is encoded using a FEC decoder, so as to reproduce the data. A condition of the network is assessed by analyzing the communication traffic. Depending on the condition of the network, an error rate threshold, for the bit sequence provided to the FEC decoder, is adjusted.

The present disclosure will be more fully understood from the following detailed description of the embodiments thereof, taken together with the drawings in which:

DETAILED DESCRIPTION OF EMBODIMENTS

Overview

Figures 1, 2:
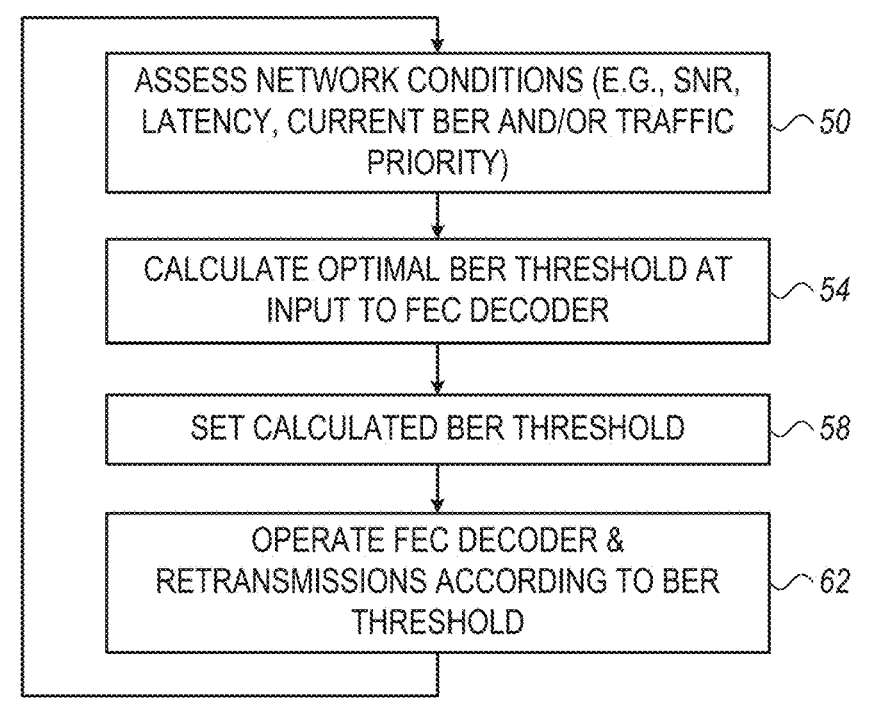
FIG. 1 is a block diagram that schematically illustrates a data communication system including a communication device that uses Bit Error Rate (BER) threshold adaptation, in accordance with an embodiment that is described herein.
FIG. 2 is a flow chart that schematically illustrates a method for BER threshold adaptation, in accordance with an embodiment that is described herein.

Embodiments that are described herein provide improved methods and systems for communication, which adapt an error rate threshold of a received bit sequence based on current network conditions.

In some disclosed embodiments, a communication device comprises a receiver, a FEC decoder and a processor. The receiver receives, over a network, communication traffic that conveys a bit sequence comprising data encoded with a Forward Error Correction (FEC) code. The FEC decoder decodes the FEC that encodes the bit sequence, thereby reproducing the data.

The processor assesses one or more conditions of the network, e.g., Signal-to-Noise Ratio (SNR), latency, current Bit Error Rate (BER) and/or a priority assigned to the communication traffic. Depending on the assessed network condition(s), the processor adjusts an error rate threshold for the bit sequence provided to the FEC decoder.

In some embodiments, the error rate threshold is used for triggering retransmission, i.e., the processor requests retransmission of at least part of the data in response to detecting that the actual error rate of the received bit sequence exceeds the error rate threshold.

By adapting the error rate threshold, the processor can optimize the operating point at which a communication system no longer relies on the FEC code for error correction and reverts to retransmission. This trade-off can be set to optimize various system performance measures, e.g., bandwidth efficiency, power consumption or latency. The system may track the optimal error rate threshold continually, and in this manner maintain optimal performance under varying network conditions.

System Description

FIG. 1 is a block diagram that schematically illustrates a data communication system 20, in accordance with an embodiment that is described herein. In the present example, system 20 comprises two communication devices 24 that communicate over a network 28.

Communication devices such as devices 24 can be used in a wide variety of systems and network environments. In an example embodiment, network 28 is an Ethernet network, and devices 24 are embodied in Ethernet switches, routers and/or network adapters. Alternatively, the disclosed techniques can be used in any other suitable system and with any other suitable communication protocol. The figure shows only two devices 24 for the sake of clarity—Real-life systems typically comprise multiple communication devices.

Communication between devices 24 is typically bidirectional. For clarity, however, the description that follows refers mainly to transmission of traffic from the left-hand side communication device 24 to the right-hand side communication device 24. The right-hand side communication device is sometimes referred to simply as "device", and the left-hand-side communication device is sometimes referred to as "peer device".

Device 24 receives communication traffic that is transmitted by the peer device over network 28. The received communication traffic conveys a bit sequence comprising data encoded with a Forward Error Correction (FEC) code. Device 24 processes the received communication traffic to as to reproduce the data. Among other tasks, device 24 adapts an error rate threshold set for the bit sequence prior to FEC decoding, using methods that are described herein. The embodiments described herein refer mainly to a Bit Error Rate (BER) threshold, by way of example. In alternative embodiments, the error rate threshold may be defined with respect to symbols (i.e., a Symbol Error Rate—SER), with respect to frames (i.e., a Frame Error Rate—FER), or with respect to any other unit of data.

In the example of FIG. 1, communication device 24 comprises a receiver 32, a FEC decoder 36 and a processor 40. Processor 40 comprises, among other modules, a retransmission management module 44 and a BER threshold adaptation module 48.

Receiver 32 receives communication traffic, e.g., a stream of communication packets, from network 28. The communication traffic conveys data that has been encoded with a FEC code. FEC decoder 36 decodes the FEC code so as to reproduce the data. The decoded data is provided to a user or to some higher communication layer as appropriate.

Two BER thresholds are defined in device 24:

System BER threshold. The system BER threshold is defined for the decoded data at the output of FEC decoder 36, i.e., after error correction. The BER threshold at this point typically depends on the application that uses the data. For example, a certain system BER threshold may be defined for video data, and a different BER threshold may be defined for general-purpose data transfer.

Adaptive BER threshold, also referred to as "raw BER threshold". This BER threshold is defined for the bit sequence at the input to FEC decoder 36, i.e., the raw bit sequence produced by receiver 32 before error correction. The raw BER threshold is adjusted adaptively using the techniques described herein.

In some embodiments, communication devices 24 support a retransmission mechanism for retransmitting data units (e.g., frames or packets) that were not received properly. In the example of FIG. 1, retransmission management module 44 of device 24 monitors the BER of the bit sequence at the input of FEC decoder 36 (referred to as "raw BER"). If the raw BER of a certain data unit exceeds the raw BER threshold, module 44 requests the peer communication device to retransmit the data unit. (Device 24 typically comprises a suitable transmitter for transmitting traffic over network 28, including retransmission requests. The transmitter is not shown in the figure for clarity.)

As can be appreciated from the description above, the value of the raw BER threshold determines an operating point, at which device 24 stops relying on FEC decoder 36 for error correction and reverts to retransmission. In some embodiments, BER threshold adaptation module 48 adjusts the raw BER threshold adaptively, based on the current network conditions. Example use-cases for adapting this operating point are discussed further below.

The configuration of system 20 and communication device 24 shown in FIG. 1 are example configurations, which are chosen purely for the sake of conceptual clarity. In alternative embodiments, any other suitable configuration can be used. Elements that are not necessary for understanding the principles of the present invention have been omitted from the figures for clarity.

The various elements of communication device 24 may be implemented in hardware, e. g., in one or more Application-Specific Integrated Circuits (ASICs) or FPGAS, in software, or using a combination of hardware and software elements.

In some embodiments, processor 40 comprises a general-purpose processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

BER Threshold Adaptation Based on Network Conditions

In various embodiments, BER threshold adaptation module 48 may adjust the raw BER threshold based on various conditions of network 28. Examples of network conditions that can be assessed by module 48 and used for setting the raw BER threshold include the following:

A Signal to Noise Ratio (SNR) associated with the data. The SNR is typically measured at the physical layer (PHY), e.g., by physical-layer circuitry of receiver 32.

A latency of communication the traffic in traversing network 28.

The current BER of the data.

A priority assigned to the communication traffic. The priority may be expressed, for example, in terms of a Quality-of-Service (QOS) class, service class, or in any other way.

Additionally, or alternatively, module 48 may use any other suitable network condition or combination of conditions.

In various embodiments, BER threshold adaptation module 48 may set the raw BER threshold to achieve various system objectives and trade-offs. Several non-limiting examples include the following:

Improved Error Handling: By adjusting the raw BER threshold, module 48 can actively manage when to rely on FEC decoder 36 for error correction, and when to initiate retransmissions. For example, lowering the raw BER threshold in high-error environments (e.g., in response to measuring a low SNR) would help trigger retransmissions before errors accumulate and exceed the error correction capability of FEC decoder 36.

Bandwidth and Energy Efficiency: By adjusting the raw BER threshold, module 48 can reduce the overhead incurred by excessive error correction and retransmissions. As a result, both bandwidth efficiency and power consumption are improved (since less bandwidth and power need to be allocated to retransmission requests and responses).

Latency: In latency-sensitive applications, adjusting the raw BER threshold manages the trade-off between FEC error correction delay and retransmission delay, thereby improving performance.

Consider, for example, a high-speed network with varying conditions. When conditions are good, e.g., high SNR and small latency, module 48 may set a relatively high raw BER threshold. This setting will put most of the error correction burden on FEC decoder 36, since the raw error rate is low anyhow, and avoid avoiding unnecessary retransmissions. This setting maximizes throughput and minimizes latency. When network conditions deteriorate, e.g., SNR becomes lower and error rates increase, module 48 may decrease the raw BER threshold to a lower value. This threshold is typically much less than the error correction capability of FEC decoder 36. This setting would trigger retransmissions before the errors exceed the correction capabilities of FEC decoder 36. This setting thus improves data integrity and prevents accumulation of uncorrectable errors.

FIG. 2 is a flow chart that schematically illustrates a method for BER threshold adaptation, in accordance with an embodiment that is described herein. The method begins with BER threshold adaptation module 48 assessing the current conditions in network 28, at an assessment stage 50. Module 48 typically assesses the network conditions by analyzing the communication traffic received by receiver 32. The assessed conditions may comprise, for example, SNR, latency, current BER and/or the priority assigned to the traffic.

At a threshold calculation stage 54, module 48 calculates the optimal value for the raw BER threshold, based on the assessed network conditions. In example embodiments, module 48 may evaluate a defined function that gives the raw BER threshold as a function of network conditions. In other embodiments module 48 may hold a look-up table (LUT) that is accessed by network conditions and outputs the raw BER threshold. Alternatively, any other suitable calculation can be used.

At a threshold setting stage 58, module 48 sets the raw BER threshold to the optimal value calculated at stage 54. At an operation stage 62, FEC decoder 36 and retransmission management module 44 operate in accordance with the set raw BER threshold. In particular, module 44 requests retransmission of a data unit if the raw BER of the data units exceeds the raw BER threshold.

The method loops back to stage 50 above, and the process continues repeatedly.

Although the embodiments described herein mainly address adaptation of error rate thresholds in receivers of network devices, the methods and systems described herein can also be used in other applications that involve error correction, such in satellite as communication systems and other wireless communication applications.

It will thus be appreciated that the embodiments described above are cited by way of example, and that the invention is not limited to what has been present particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions explicitly or implicitly in the present specification, only the definitions in the present specification should be considered.

The invention claimed is:

1. A communication device, comprising:
a receiver, to receive, over a network, communication traffic that conveys a bit sequence comprising data encoded with a Forward Error Correction (FEC) code;
a FEC decoder, to decode the FEC that encodes the bit sequence, so as to reproduce the data; and
a processor, to:
assess a varying condition of the network by analyzing the communication traffic;
repeatedly adapt an error rate threshold for the bit sequence provided to the FEC decoder, thereby causing the error rate threshold to match the varying condition of the network; and
request retransmission of at least part of the data in response to detecting that an actual error rate of the bit sequence exceeds the error rate threshold, which is adapted repeatedly to match the varying condition of the network.

2. The communication device according to claim 1, wherein, by adapting the error rate threshold, the processor is to adjust a trade-off between (i) error correction by the FEC code and (ii) error correction by the retransmission.

3. The communication device according to claim 1, wherein the processor is to adapt the error rate threshold to a value that is less than an error correction capability of the FEC code.

4. The communication device according to claim 1, wherein the processor is to identify a priority assigned to the communication traffic, and to adapt the error rate threshold based on both the condition of the network and the priority.

5. The communication device according to claim 1, wherein, to assess the condition of the network, the processor is to measure a Signal to Noise Ratio (SNR) of the communication traffic.

6. The communication device according to claim 1, wherein, to assess the condition of the network, the processor is to measure a latency of the communication traffic.

7. The communication device according to claim 1, wherein, to assess the condition of the network, the processor is to measure a Bit Error Rate (BER) of the communication traffic.

8. A communication method, comprising:
receiving, over a network, communication traffic that conveys a bit sequence comprising data encoded with a Forward Error Correction (FEC) code;
using a FEC decoder, decoding the FEC that encodes the bit sequence, so as to reproduce the data;
assessing a varying condition of the network by analyzing the communication traffic;
repeatedly adapting an error rate threshold for the bit sequence provided to the FEC decoder, thereby causing the error rate threshold to match the varying condition of the network; and
requesting retransmission of at least part of the data in response to detecting that an actual error rate of the bit sequence exceeds the error rate threshold, which is adapted repeatedly to match the varying condition of the network.

9. The method according to claim 8, wherein adapting the error rate threshold comprises adjusting a defined trade-off between (i) error correction by the FEC code and (ii) error correction by the retransmission.

10. The method according to claim 8, wherein adapting the error rate threshold comprises adapting the error rate threshold to a value that is less than an error correction capability of the FEC code.

11. The method according to claim 8, further comprising identifying a priority assigned to the communication traffic, and adapting the error rate threshold based on both the condition of the network and the priority.

12. The method according to claim 8, wherein assessing the condition of the network comprises measuring a Signal to Noise Ratio (SNR) of the communication traffic.

13. The method according to claim 8, wherein assessing the condition of the network comprises measuring a latency of the communication traffic.

14. The method according to claim 8, wherein assessing the condition of the network comprises measuring a Bit Error Rate (BER) of the communication traffic.

\* \* \* \* \*